United States Patent Office 3,579,530
Patented May 18, 1971

3,579,530
PROCESS FOR THE RESOLUTION OF RACEMIC TETRAMISOLE
Robert Alfred Dewar, Ashburton, Victoria, Volker Elmar Maier, Hampton, Victoria, and Margaret Anthea Ingram, South Yarra, Victoria, Australia, assignors to Imperial Chemical Industries of Australia and New Zealand Limited
No Drawing. Filed Aug. 12, 1968, Ser. No. 751,716
Claims priority, application Australia, Aug. 24, 1967, 26,376; Jan. 11, 1968, 32,285; Jan. 18, 1968, 32,424
Int. Cl. C07d 99/06
U.S. Cl. 260—306.7  7 Claims

ABSTRACT OF THE DISCLOSURE

Resolution of tetramisole into its optically active D- and L-isomers using a resolving acid in a predominantly aqueous medium whereby said acid forms a salt with one of the isomers and said salt crystallises from the medium to the substantial exclusion of the other tetramisole isomer salt.

---

This invention relates to a process of isolation and preparation in high purity of the optical isomers L(−)-6-phenyl - 2,3,5,6 - tetrahydroimidazo(2,1 - b)thiazole, free or substantially free of its D-isomer, and D(+)-6-phenyl-2,3,5,6 - tetrahydroimidazo(2,1 - b)thiazole, free or substantially free of its L-isomer; and compounds are referred to in this specification as L- and D-tetramisole respectively. The process is particularly valuable for the isolation of L-tetramisole.

The optically inactive racemate of said isomers, D,L-tetramisole, is known to be a potent drug for the treatment of helminthiasis in warm-blooded animals, particularly in sheep, cattle, pigs, dogs and fowls. It is also known that the laevo-isomer, L-tetramisole, is responsible for all or most of the anthelmintic activity, at least in ruminants such as sheep or cattle. On the other hand the systemic toxicities to most host animals treated, e.g. sheep, cattle and also mice, of the D- and L-tetramisole are of approximately the same order. It follows that administration of L-tetramisole gives anthelmintic activity with substantially reduced risk of toxic reactions.

Although the D,L-tetramisole racemate itself has a wide safety margin for most species, the practically doubled safety margin of the L-isomer has great value when it is administered under poor control in the field, particularly under the extremes of conditions of sheep- and cattle-farming in the Australian outback or in the open ranges in the U.S.A., where prolonged drought may unpredictably reduce the resistance of individual animals. Furthermore, for subcutaneous injection lower dosages than those required for the racemate greatly facilitate administration; finally, for any development of tetramisole for human medicine, the virtual doubling of its safety margin is of great value.

In addition, for many species of helminths, the anthelmintic activity of the D-isomer is so low that its conversion to L-isomer, e.g. its racemisation to D,L-tetramisole, greatly enhances its value. In other words, because of its low anthelmintic activity, D-isomer may be simply considered a low value intermediate to L-isomer. D,L-tetramisole is a sophisticated chemical which is difficult and expensive to synthesise. Hence, if it is possible to separate D-isomer and racemise it to D,L-racemate, the overall yield of the desired L-isomer may be increased and furthermore, if the cost of resolution and racemisation is below that of the synthesis of the racemate, then L-isomer may be produced more cheaply than D,L-racemate on an equivalent dose basis. Relatively simple resolution of the D,L-racemate is therefore an important prerequisite for utilisation of the D-isomer by conversion to L-isomer.

As far as we know the resolution of the tetramisole isomers from the racemate in an aqueous medium and particularly in water without any addition of organic solvent has never been achieved. Hitherto all attempts at such a simple and inexpensive process of resolution have failed, because none of the conventional resolving acids considered forms a salt with one of the tetramisole isomers which would be sufficiently less soluble in water than the corresponding salt of the antipode isomer to permit efficient separation, and which at the same time is crystallisable from the medium.

It is one object of our invention to provide a method of resolving the optical isomers of tetramisole and in particular of separating an L-isomer derivative in high yield and high purity in a single crystallisation step. Another object is to use water as the medium for the crystallisation of a sparingly soluble tetramisole isomer salt. A further object of our invention is to provide an efficient, integrated process for the resolution and purification of the isomers of tetramisole and for the efficient recovery of the resolving acid. Yet another object is to provide D-tetramisole isomer as a cheap intermediate for at least partial conversion to L-tetramisole.

We have discovered that certain carboxylic acids may be used to precipitate in one step at least 65% and as much as 90% by weight or more of the L-tetramisole present in high purity, as high as and better than 99% from aqueous solutions, particularly water itself.

Accordingly we provide a process of separating the optically active D- and L-isomers of tetramisole from their racemate (D,L)-tetramisole which comprises adding to a solution of said racemate or a water soluble derivative thereof in a predominantly aqueous medium, a resolving agent consisting of an optically active isomer of a carboxylic acid or a water soluble derivative thereof, which acid has a molecular weight greater than 250, forms a salt with one of said tetramisole isomers having a solubility in said aqueous medium considerably lower than that of the corresponding salt of the other tetramisole isomer and wherein the concentration of said racemate in solution is such that said less soluble tetramisole isomer salt crystallises from said aqueous medium to the substantial exclusion of the other tetramisole isomer salt.

Preferably organic solvent is absent from the medium. Preferred are carboxylic resolving acids as defined which form diasteroisomeric salts with L- to D-tetramisole respectively having a solubility (weight) ratio less than 1:4. Particularly suitable carboxylic acids are the amino acids which bear certain substituents, increasing the molecule to the desired bulk and the salts of which themselves are suitably soluble in the aqueous medium.

Accordingly we provide a process for separating D- and L-tetramisole isomers from their D,L-tetramisole racemate which comprises precipitating the diastereoisomeric salt of one tetramisole isomer from a solution of the D,L-racemate or a water soluble derivative in an aqueous medium by treating said solution with a resolving agent which consists of a water soluble derivative of an optically active isomer of an amino acid and which resolving agent is soluble in water to the extent of at least 3 parts per 100 parts by weight, has a molecular weight greater than 250, comprises a substituent RX, R being hydrocarbyl, optionally substituted, and X being a stable linking group bonded to the amino group of the amino acid, and reacts with one tetramisole optical isomer to form a diastereoisomeric tetramisole salt which has a solubility in said aqueous medium at least 4 times lower than that of the corresponding diastereoisomeric salt of the other tetramisole isomer, thereby precipitating the diastereoisomeric salt of said one tetramisole isomer from the aqueous medium.

Particularly preferred is the process where the less soluble diastereoisomeric salt is a salt of L-tetramisole. A preferred linking group X is —SO$_2$—.

Suitable resolving agents within this group are e.g. the derivatives of glutamic acid. Accordingly we provide a preferred process of separating D- and L-tetramisole isomers from their D,L-tetramisole racemate wherein a solution of D,L-tetramisole racemate or a water solutble salt thereof in an aqueous medium is treated with an optically active derivative of L(+)-glutamic acid having a molecular weight greater than 250 and a substituent RX attached to the amino group, R being a hydrocarbyl radical and X a linking group as defined, and wherein, after addition of sufficient resolving acid to convert all of the L-tetramisole to its diastereoisomeric salt and after precipitation of said salt, the weight ratio of L- to D-tetramisole isomer remaining in solution is less than 1:8, and the concentration of said D-tetramisole salt in the aqueous medium is maintained such that substantially all of if is dissolved in the medium, thereby precipitating substantially pure crystals of said L-tetramisole diastereoisomeric salt to the substantial exclusion of said D-tetramisole diastereoisomeric salt.

Suitable aryl groups of the substituted glutamic acids in our processes include for example p-nitrophenyl, p-bromophenyl, p-fluorophenyl, phenyl and p-tolyl, i.e. N-arylsulphonylglutamic acids suitable as resolving acids are N-p-nitrobenzenesulphonyl-D(—)-glutamic acid (A),
N-p-nitrobenzenesulphonyl-L(+)-glutamic acid (B),
N-p-bromobenzenesulphonyl-D(—)-glutamic acid (A),
N-p-bromobenzenesulphonyl-L(+)-glutamic acid (B),
N-p-fluorobenzenesulphonyl-L(+)-glutamic acid (A),
N-p-fluorobenzenesulphonyl-D(—)-glutamic acid (B),
N-benzenesulphonyl-L(+)-glutamic acid (A),
N-benzenesulphonyl-D(—)-glutamic acid (B),
N-p-toluenesulphonyl-L(+)-glutamic acid (A) and
N-p-toluenesulphonyl-D(—)-glutamic acid (B), where the acids denoted with (A) form less soluble diastereoisomeric salts with L-tetramisole and those denoted with (B) form less soluble diastereoisomeric salts with D-tetramisole.

The benzenesulphonyl-, N - p - fluorobenzenesulphonyl- and, particularly, the N-p-toluenesulphonyl-glutamic acids are preferred since their isomers based on commercially readily available L(+)-glutamic acid, precipitate the L-isomer.

The N-p-toluensulphonylglutamic acids are particularly preferred because direct separation of the tetramisole isomer in one step in yields up to and greater than 90% and purity better than 98% of the precipitated tetramisole is obtained; N-p-toluenesulphonyl-L(+)-glutamic acid is most preferred. As already stated, water is the preferred medium; however, water soluble solvents or even organic impurities may be present in the water. Because the remarkable solubility differential of the D- and L-tetramisole salts of said N-arylsulphonylglutamic acids affords separation with high efficiency and purity, up to 99.5% in one step, there is little incentive to add expensive organic solvent for any marginal further improvement in our one-step resolution; however, during the work-up of the aqueous mother liquor organic solvents may be used and, on recycling, may be entrained into the aqueous crystallising medium. The suitability for our process of predominantly aqueous media comprising some organic solvent is then a matter of some convenience. As much as 20% solvent can be tolerated.

It will be understood by those skilled in the art that our process, wherever described or exemplified in this specification with respect to the resolution of D,L-tetramisole using an optically active derivative of one acid, say said L(+)-glutamic acid, to form less soluble L-tetramisole salts, applies equally well, mutatis mutandis, to the use of the corresponding opposite resolving acid derivative of say, D(—)-glutamic acid, to form less soluble salts of D-tetramisole.

With our preferred compounds, N-p-fluorobenzenesulphonyl-, N-benzenesulphonyl- and N-p-toluenesulphonyl-glutamic acid salts, it so happens that said sparingly soluble diastereoisomeric salts will contain two components of the same absolute configuration, L,L or D,D but one component is optically laevorotatory and the other component is optically dextrorotatory, when the experimental determination for this definition is carried out in chloroform in the case of tetramisole and in ethyl acetate in the case of the N-arylsulphonylglutamic acid.

By a "water soluble" tetramisole racemate derivative we mean that on appreciable amount, say more than 5 g., preferably more than 10 g. of it, is soluble in 100 g. of water; typicaly derivatives are the tetramisole salts, particularly the salts of strong acids and mineral acids.

A preferred water soluble derivative of tetramisole racemate is D,L-tetramisole hydrochloride. Other water soluble tetramisole salt derivatives, e.g. the sulphates, bromides, acetates are known. Cations suitable for forming the water soluble N-arylsulphonyl-D(—)-L(+)-glutamic acid salts. e.g. the alkali metals, are known, too; other water soluble salts will be obvious to those skilled in the art.

The resolving acid need not be added in the form of its monobasic salt; dibasic acids such as the stated glutamic acid derivatives may be added in the form of a dibasic salt, or the resolving acid may be added as such and in each case the pH is suitably adjusted by the addition of an acid, e.g. a mineral acid, or a base. Thus, in a preferred process, each mole of the tetramisole isomer to be separated from its antipode is treated with between 0.9 and 1.2 moles of said resolving acid and the pH is adjusted to a value between 3.0 and 5.0, preferably between 3.8 and 4.2. When N-p-toluene-sulphonyl-L(+)-glutamic acid is used as the resolving acid, preferred but not necessarily critical conditions for precipitation are about equimolar proportions of L-tetramisole and resolving acid; concentration of D,L-tetramisole, expressed as the hydrochloride, not in excess of 10 parts per 100 parts of water; a pH of 4.0±0.2 and heating to between 70° and 90° C., followed by cooling to 20° C. under stirring.

Cooling below the temperature at which the aqueous medium is saturated in respect of the D-tetramisole salt or in respect of the racemate salt tends to yield a lower quality product. The pH shows a fairly marked optimum at 4, for both yield and quality. Departure from the 1:1 molar ratio of desired tetramisole isomer to optically active acid is possible, but on balance there is no economic incentive. More concentrated solutions in water do not increase the batch yield of actual L-tetramisole, but merely result in gradually increasing co-precipitation of D-tetramisole salt.

Another alternative according to this invention is to react one mole of D,L-tetramisole (base) in water, in the presence of one mole of D,L-tetramisole hydrochloride, with one mole of N-arylsulphonyl-L(+)-glutamic acid; yet another possibility is to react 1 mole of D,L-tetramisole (base) in water with 1 mole of N-arylsulphonyl-L(+)-glutamic acid and to adjust the pH. A particularly preferred process comprises treating D,L-tetramisole with the di-alkali metal, e.g. the disodium N-p-toluenesulphonyl-L(+)-glutamate at a temperature between 30° and 10° C. and controlling the pH by addition of acid after mixing of the reagents to a final value between 3.8 and 4.0. Preferably preformed seeding crystals are added during the pH adjustment. Under these conditions heating and cooling are not required and the controlled addition of acid, e.g. hydrochloric acid, allows exact control of the precipitation of the diastereoisomeric salt of L-tetramisole in high yield and purity. In addition, because of the elimination of the heating and cooling steps, the precipitation cycle on plant scale is substantially shortened and an increase in production capacity is obtained.

The recovery and recycle of the D- and L-tetramisole left in solution is discussed below in respect of the N-p-toluenesulphonyl - L(+) - glutamic acid/L - tetramisole process, but it is to be understood that it is applicable generally to the resolving acids of this invention and both tetramisole isomers.

D- and L-tetramisole, left behind in the mother liquor after crystallisation and removal of the sparingly soluble L-tetramisole N-p-toluenesulphonyl-L(+)-glutamic acid salt or its analogous D-D antipode respectively, may be recovered by adding an alkalising agent, e.g. sodium hydroxide, to the mother liquor, until the tetramisole bases are set free, extracting said bases with a water-immiscible solvent, separating the solvent phase and recovering the bases.

Accordingly we provide a process comprising the additional steps of adding an alkalising agent to the aqueous mother liquor from the crystallisation step above-described until the D(+)- and/or L(-)-tetramisole bases contained therein are set free, extracting said bases into a water-immiscible solvent phase, separating said solvent phase and recovering said bases. Alternatively the base may be separated directly as a separate phase, without solvent extraction.

The selection of the solvent for extraction of the tetramisole base is simple, essentially a matter of convenience; the main requirements are that the solvent is immiscible with water and chemically inert in the medium. Suitable solvents for this extraction are e.g. perchlorethylene, trichlorethylene, toluene and benzene.

The mixture of tetramisole isomers in the extract from the aqueous mother liquor, usually consisting of the bulk of one and the residue of the antipode isomer, may be recovered by conventional methods, e.g. by careful evaporation of the solvent preferably under mild conditions. Because of the limited thermal stability of tetramisole, the boiling point of the solvent should be fairly low, say below 180° C. Often it is better to avoid evaporation altogether; instead tetramisole may be converted into a salt insoluble in the organic phase, e.g. into its hydrochloride e.g. by treatment with HCl gas, or by re-extraction into water with acid. Yet another possibility is partial evaporation leaving a residual solvent, suitable for the subsequent racemisation, such as toluene, behind to protect the base. The concentration in the solute of the isomer predominating in the extract, say D-tetramisole, when L-tetramisole was isolated as the N-toluenesulphonyl-L(+)-glutamate in the aqueous crystallisation step, is usually so high—say near 70–90%—that it is a suitable raw material for efficient conversion to the other isomer, e.g. by means of a racemisation process. Alternatively, whenever one isomer predominates in the residue, say D-tetramisole in the case of our preferred process, the solvent, e.g. perchlorethylene, may be cooled e.g. in the case of perchlorethylene to a temperature below 37° C., to obtain a crop of a mixture of D- and L-tetramisole, i.e. essentially the racemate; the supernatant mother liquor may be removed and on further cooling, e.g. in the case of perchlorethylene below —10° C., the residue of the highly concentrated predominant tetramisole isomer, i.e. in our preferred process crude D-isomer, may be recovered.

The crude D-tetramisole so obtained is a suitable starting material for racemisation to D,L-tetramisole.

Accordingly we also provide a process of recovering tetramisole from its solution in the organic water immiscible phase extract from the aqueous basified mother liquor which comprises cooling said extract, preferably a solution in perchlorethylene, until a first precipitate consisting of substantially D,L-tetramisole racemate is obtained, removing said racemate and then cooling further until the bulk of the residual tetramisole isomer predominant in said extract from the organic mother liquor is precipitated and recovering said second precipitate. In our preferred process the L-diastereoisomer is crystallised from the aqueous medium, racemate is crystallised out from the organic extract as the first precipitate (first crystal crop) and D- is the predominant isomer, precipitated from the remaining organic mother liquor as a second precipitate (second crystal crop).

The selection of the solvent for extraction of the tetramisole base and subsequent further crystallisation is also simple, essentially a matter of convenience; the main requirements are that the solvent is immiscible with water and chemically inert in the medium and is a good, but preferably not excessively strong solvent for tetramisole. Thus chlorinated hydrocarbons, e.g. perchlorethylene, trichlorethylene, aromatic solvents e.g. toluene or xylene or higher ketones, e.g. methylisobutylketone are suitable. Excessive solvent power is inconvenient although not necessarily inoperative, since the resultant L- or D-tetramisole base solutions become viscous on saturation. Other desiderata are non-inflammability and an intermediate boiling point, say between 80° and 180° C. for convenience of handling or suitability for subsequent processing such as racemising D-tetramisole and therefore compatibility with the reagents in the racemisation reaction, but these desiderata are not limiting.

The proportions of tetramisole in the organic extract and the crystallisation temperatures are not narrowly critical. Suitable proportions depend on solvent, temperature and the efficiency of the aqueous crystallisation step and are readily determined for each system by those skilled in the art. Using perchlorethylene we have found the following operative and preferred ranges for the first crystallisation step from perchlorethylene yielding essentially D,L-tetramisole racemate and the second crystallisation step from perchlorethyelne yielding essentially crude D-tetramisole;

|  | Crystallisation from perchlorethylene extract | | | |
|---|---|---|---|---|
|  | 1st crystallisation | | 2nd crystallisation | |
|  | Grams tetramisole/100 grams of PCE[1] | Temperature range, ° C. | Grams tetramisole/100 grams PCE | Temperature range, ° C. |
| Operative range | 35–4 | 50–0 | 30–3 | 30–20 |
| Preferred range | 20–10 | 40–20 | 18–8 | 16–20 |

[1] PCE=perchlorethylene.

It will be understood that there will be a time interval and a temperature differential between the first and second perchlorethylene crystallisation steps or, alternatively, that the extract is concentrated between the steps but, since both steps occur on progressive cooling over temperature ranges, the differential is not narrowly critical and may be small.

The resolving acids may be prepared from the D(—) or L(+)-glutamic acids; of these L(+)-glutamic acid, in particular, in the form of its monosodium salt, is a relatively cheap commodity, widely used as a food additive.

Conversion to the arylsulphonyl derivatives stated above by the conventional reaction with aryl, e.g. benzene- or p-toluenesulphonyl chlorides respectively is easy and inexpensive. It should be noted that the unmodified glutamic acid is inoperative as a resolving agent. The resolving acids, e.g. N-benzenesulphonyl- or N-p-toluenesulphonyl-L(+)- or D(-)-glutamic acids are easily recovered from their L(-)- or D(+)-tetramisole salts respectively by reacting these with aqueous alkaline solution until the tetramisole base is set free as a solid or by extracting the tetramisole bases with a water immiscible organic solvent, and then acidifying the aqueous medium to form the N-arylsulphonyl-L(+)- or D(-)-glutamic acid or its monoalkali metal salt.

Accordingly we also provide a process of recovering N-arylsulphonyl-D(-)- or L(+)-glutamic acid from its sparingly soluble salt with the tetramisole isomer of the corresponding absolute configuration which comprises treating said salt in an aqueous medium with a strong alkalising agent, preferably alkali hydroxide, dissolving the N-arylsulphonyl glutamate formed in the aqueous medium, and setting the tetramisole base free and recovering said base then as a solid by filtration or by extracting it with a water-immiscible solvent into a solvent phase and separating said solvent phase from the aqueous phase and recovering the aqueous phase containing the N-arylsulphonyl glutamate.

The dibasic N-arylsulphonyl glutamate is then used as such or converted into a form suitable for re-use in the reaction with fresh tetramisole racemate salt, e.g. it is half neutralised with an acid, say hydrochloric acid, to form the monosodium N-arylsulphonyl-D(-)-or L(+) glutamate. In the latter case several cycles—preferably two recycles of the monosodium N-arylsulphonyl glutamate to the aqueous crystallisation steps—may be carried out. After this it becomes desirable to discard this aqueous solution because of build-up of inorganic salts. The N-arylsulphonyl-L(+)-glutamic acid may however be recovered from the solution as its L-tetramisole salt, the mother liquor containing the inorganic salts is then discarded, the said L-tetramisole salt is slurried with a volume of water equal to that of the discarded mother liquor, an alkalising agent is added until a pH 10.5–12 is reached, the salt of the N-arylsulphonyl-L(+)-glutamic acid is dissolved in the aqueous phase and the liberated L-tetramisole base is recovered by filtration or by extraction with a water immiscible solvent. The aqueous solution of the salt of the N-arylsulphonyl-glutamic acid may now be re-used for a further series of operations as described in Examples 2 to 4.

For certain purposes, e.g. human medicine or subcutaneous injections it may be required to produce L-tetramisole of exceptionally low D-isomer content. This may be done by dissolving the N-p-toluenesulphonyl-L (+)-glutamate salt of L-tetramisole in hot water and crystallising it. The same mother liquor may be used several times without appreciable loss of product quality and with economy in recovery of product and resolving acid. The mother liquor may finally be used as make-up in the resolution cycle above described. This method of purification is superior to recrystallisation of the free base or its ordinary salts, since the D,L-base and its common salts are markedly less soluble than the pure isomer or its salts which constitutes a limit to the purification obtainable. This limitation does not apply to the use of our resolving acid salt.

Accordingly we also provide a process of purifying L-tetramisole, which comprises recrystallising it as the diastereoisomeric salt of N-p-toluenesulphonyl-L(+)-glutamic acid.

An advantage of our resolution process is that it can be performed with relatively crude D,L-tetramisole which in routine manufacture requires purification from an organic solvent, say alcohol. In our process this expensive medium is replaced by water, improved purity is achieved and resolution is obtained at the same time. The whole sequence of operations, demonstrated in Examples 2 to 8 inclusive, represents an integrated process giving a product of excellent veterinary quality with minimum loss of the L-isomer in the D-fraction, and minimum loss of resolving acid.

Accordingly we also provide a process of resolving tetramisole racemate which process comprises isolating an optical isomer of tetramisole, preferably L-tetramisole, in an aqueous medium by precipitating the tetramisole diastereoisomeric salt A of a resolving acid selected from the group consisting of N-benzenesulphonyl-L(+)-glutamic acid, N-p-fluorobenzenesulphonyl-L(+)-glutamic acid and N-p-toluenesulphonyl-L(+)-glutamic acid; extracting the D-tetramisole isomer and residual racemate B from the aqueous phase mother liquor C into an organic solvent $S_1$, which forms a separate phase, to obtain an extract D; precipitating said residual racemate B by cooling exract D and recovering racemate B; treating said solvent $S_1$ further to precipitate a residue E of crude D-tetramisole isomer and recovering E; then reacting said diastereoisomeric salt A with an alkalising agent F to liberate L-tetramisole as the base and to form the salt G of alkalising agent F with the resolving acid, extracting the L-tetramisole isomer as a base from the aqueous medium into an organic solvent $S_2$ to form an organic phase extract H and recovering said salt G or its acid derivative K capable of reacting with fresh D,L-tetramisole racemate; recovering the L-isomer from extract H by separating the solvent $S_2$ from the isomer and recycling salt G or its acidic derivative K to a further reaction cycle with fresh D,L-tetramisole; then repeating the cycle as described in this paragraph 2 to 5 times.

We also provide the novel salts (and their monohydrates) which are formed in the practice of the invention and are, therefore, useful for resolving the D,L-tetramisole racemate and recovering the optically active isomers therefrom:

L(-)-tetramisole N-benzenesulphonyl-L(+)-glutamate;
D(+)-tetramisole N-benzenesulphonyl-D(-)-glutamate;
L(-)-tetramisole N-benzenesulphonyl-D(-)-glutamate;
D(+)-tetramisole N-benzenesulphonyl-L(+)-glutamate;
L(-)-tetramisole N-p-toluenesulphonyl-D(-)-glutamate;
D(+)-tetramisole N-p-toluenesulphonly-L(+)-glutamate;
L(-)-tetramisole N-p-fluorobenzenesulphonyl-L(+)-glutamate;
D(+)-tetramisole N-p-fluorobenzenesulphonyl-D(-)-glutamate;
L(-)-tetramisole N-p-fluorobenzenesulphonyl-D(-)-glutamate;
D(+)-tetramisole N-p-fluorobenzenesulphonyl-L(+)-glutamate;
L(-)-tetramisole N-p-nitrobenzenesulphonyl-L(+)-glutamate;
D(+)-tetramisole N-p-nitrobenzenesulphonyl-D(-)-glutamate;
L(-)-tetramisole N-p-nitrobenzenesulphonyl-D(-)-glutamate;
D(+)-tetramisole N-p-nitrobenzenesulphonyl-L(+)-glutamate;
L(-)-tetramisole N-p-bromobenzenesulphonyl-L(+)-glutamate;
D(+)-tetramisole N-p-bromobenzenesulphonyl-D(-)-glutamate;
L(-)-tetramisole N-p-bromobenzenesulphonyl-D(-)-glutamate and
D(+)-tetramisole N - p - bromobenzenesulphonyl-L(+)-glutamate;

and in particular L(-)-tetramisole N-p-toluenesulphonyl-L(+)-glutamate and D(+) - tetramisole N-p-toluenesulphonyl-D(-)-glutamate.

Our invention is now described by, but not limited to the following examples.

EXAMPLE 1

The following compounds were dissolved in 62.8 ml. water, with warming:

| | G. |
|---|---|
| N-benzenesulphonyl-L(+)-glutamic acid (0.522 mole) | 15 |
| D,L-tetramisole (base) (0.0522 mole) | 10.65 |
| D,L-tetramisole hydrochloride (0.0522 mole) | 12.55 |

The solution was cooled in ice below 10° C. with stirring and allowed to stand for one hour and a quarter. The crystals were filtered off, washed twice with 2 ml. portions of ice water, dried and weighed. The crystals dried at room temperature over 24 hours were obtained as the monohydrate.

The yield of crude L-tetramisole N-benzenesulphonyl-L(+)-glutamate after prolonged drying at 70° C. in vacuo was 17.41 g. (0.0354 mole), 68% of theory. This salt was suspended in 40 ml. water and 40 ml. methylene chloride and basified to pH 12 with 40% (w./v.) aqueous sodium hydroxide solution. The methylene chloride extract was separated, washed with water, dried over anhydrous sodium carbonate and evaporated to dryness. The yield of crude L-tetramisole was 7.12 g. (0.0349 mole), 67% of theory, M.P. 57° C.

The product had a specific rotation $(\alpha)_D^{20} -77°$ ($C_{10}$, $CHCl_3$); the corresponding rotation of pure L-tetramisole determined by us was $-86.1°$. Partial resolution had thus been achieved.

EXAMPLE 2

A solution of 48.3 g. (0.15 mole) monosodium N-p-toluenesulphonyl-L-(+)-glutamate (I) in 750 ml. water (pH 4.0) was heated to 90° C. and 72.3 g. (0.30 mole) D,L-tetramisole hydrochloride was added. The solution was cooled slowly with stirring to 20° C., and the resultant crystal slurry was filtered on a basket centrifuge and washed with a minimum volume of water displacement wash, to yield 69.0 g. (0.132 mole) of the monohydrate of L-tetramisole N-p-toluenesulphonyl-L(+)-glutamate (II) (the monohydrate of 1 mole of L-tetramisole with 1 mole of N-p-toluenesulphonyl-L(+)-glutamic acid, M.P. 122° to 123° C.). To determine the purity of this product a completely identical experiment 2b was carried out and another precipitate of II was obtained. A 7 g. sample of the latter was basified with aqueous sodium hydroxide to pH 12 and extracted with methylene chloride; it yielded the theoretical amount of total tetramisole (base) $(\alpha)_D^{20} -85.3°$ ($C_{10}$, $CHCl_3$) which, compared with the corresponding optical rotation of pure L-tetramisole, is equivalent to 99.5% purity (M.P. 60.0° C.). After addition of 150 ml. perchlorethylene to the aqueous liquor from the filtration of II, aqueous caustic soda (40% w./v.) was added until the pH was 12 and, at a temperature of 40° C., the liberated tetramisole (base), mainly D-isomer, was extracted into the perchlorethylene phase. Two perchlorethylene washes of the aqueous phase of 40 ml. each were combined with the main perchlorethylene extract which then contained 30.6 g. (0.15 mole) D-tetramisole (base) and 3.7 g. (0.018 mole) L-tetramisole (base). The aqueous phase after extraction contained 6.2 g. (0.018 mole) disodium N-p-toluenesulphonyl-L(+)-glutamate (III) to which was then added the 69.0 g. of II obtained earlier. After addition of 150 ml. perchlorethylene, 40% sodium hydroxide solution was added to adjust the pH again to 12 and, at a temperature of 20° C., the liberated L-tetramisole (base) was extracted into the perchlorethylene phase. The aqueous phase was washed once with 40 ml. perchlorethylene, and the perchlorethylene extracts were combined into one solution; analysis showed that it contained 27.0 g. (0.132 mole) L-tetramisole (base), i.e. the sample had the same composition as the sample of II taken previously in the parallel experiment 2b. $(\alpha)_D^{20} -85.3°$ ($C_{10}$, $CHCl_3$) M.P. 60° C. The aqueous phase after extraction was analysed; it contained 51.7 g. (0.15 mole) of III which was converted to the monosodium salt (I) by addition of concentrated HCl until the pH of the solution was 4.0.

EXAMPLE 3

Example 2 was repeated, starting with the solution of I obtained at the end of Example 2. Within the limits of the analytical methods, yield and purity of the products obtained were identical with those obtained in Example 2.

EXAMPLE 4

Example 2 was repeated starting with the solution of I obtained at the end of Example 3. The weight of II obtained (as monohydrate) was 72.3 g. (0.138 mole), but the product was less pure than that obtained in Examples 2 or 3, i.e. the optical rotation of tetramisole (base) extracted from II in this example, $(\alpha)_D^{20} -71.9°$ ($C_{10}$, $CHCl_3$), was equivalent to about 92% L-tetramisole (base), 8% D-tetramisole (base).

We consider that this reduction in optical purity of II is due to the build-up of sodium chloride in the solution from which II is precipitated, but the disadvantage of lower purity is compensated by the higher recovery of resolving acid. The aqueous solution after the filtration of II and extraction of crude D-tetramisole (base) at 40° C. was discarded. Analysis showed that it contained 3.35 g. (0.0097 mole) of III. This loss may be further reduced if desired by addition of sodium chloride, to salt out a further precipitate containing the resolving acid.

EXAMPLE 5

The crop of (optically) impure II obtained in Example 4 was dissolved in 720 ml. water at 90° C., and after cooling to 20° C., 61.0 g. (0.117 mole) of II, optical rotation $(\alpha)_D^{20} -20.5°$ ($C_{10}$, methanol) M.P. 122.5–123.5° C., was filtered off. To determine the purity of the product a 7 g. sample was taken, basified with aqueous sodium hydroxide and extracted to give the theoretical weight of tetramisole (base) $(\alpha)_D^{20} -86.0°$ ($C_{10}$, $CHCl_3$), 99.9% pure, M.P. 60.1° C. 7 g. of a product of identical purity, obtained from parallel runs, was returned to the product to make up for the sample quantity taken. The remainder of the tetramisole in solution (substantially D,L-racemate) was converted into the base and extracted into perchlorethylene, and this extract was combined with the perchlorethylene extracts of crude D-tetramisole base obtained in Examples 2, 3 and 4. The aqueous liquor after extraction contained some III. The crop of purified II (61 g.) was added to this aqueous liquor and, after basification with 40% (w./v.) aqueous sodium hydroxide to pH 12, L-tetramisole (base) 99.9% optically pure was extracted into perchlorethylene. After extraction, the aqueous solution of III was adjusted to pH 4 to give a reconstituted solution of I ready for use in another cycle, as per Examples 2, 3, 4 and 5. The overall loss of I in the series of four Examples 2, 3, 4 and 5 was about 4% to 6%. This loss is made up before continuing a further cycle of operations as in Examples 2, 3, 4 and 5.

EXAMPLE 6

A total of 790 ml. perchlorethylene solution of crude D-tetramisole base had been obtained from Examples 2, 3, 4 and 5. Analysis showed that this solution contained 90.0 g. D-tetramisole (base) and 11.2 g. L-tetramisole (base). On heating, complete solution of the mixture of bases was obtained at temperatures above 40° C. The solution was cooled slowly. When the temperature had dropped to 37° C., crystallisation commenced. A crop of crystals was filtered off at 20° C. yielding 14.5 g. of a mixture approaching the composition of D,L-tetramisole (base), containing 53% D-isomer and 47% L-isomer $(\alpha)_D^{20} +5°$ ($C_{10}$, $CHCl_3$). This product is suitable for recycling in its hydrochloride form to replace some of the fresh D,L-tetramisole hydrochloride used in the next resolution cycle. The remaining tetramisole in solution contained 96.6% D-isomer and 3.4% L-isomer. After further cooling to —15° C., a crystal crop of 83.0 g. of crude D-tetramisole was filtered off. A sample of this was dried, dissolved in chloroform and analysis by optical rotation showed it to be 96.6% D-isomer, 3.4% L-isomer $(\alpha)_D^{20}$ +80.0° ($C_{10}$, $CHCl_3$), M.P. 58.7° C. The residual mother liquor contained about 1.9% w./v. D-tetramisole (base) and 0.1% L-tetramisole (base). This liquor may be recycled and used in further extractions of crude D-tetramisole as described in Examples 2, 3 or 4.

EXAMPLE 7

A total of 650 ml. perchlorethylene solution of L-tetramisole (base) containing 78.2 g. L-tetramisole (99.5% optically pure) had been obtained from Examples 2, 3, 4 and 5. Worked-up as the hydrochloride, this yielded 92.0 g. (0.382 mole) L-tetramisole hydrochloride $(\alpha)_D^{20}$ —123.5° ($C_{15}$, $H_2O$) (pure L-tetramisole hydrochloride, determined under identical conditions, $(\alpha)_D^{20}$ —124.8° ($C_{15}$, $H_2O$).

EXAMPLE 8

Examples 2 to 7 form an integrated resolution process for D,L-tetramisole in which after equilibration of all recycles the final overall yields are as follows: 97.5% of theory of technical L-tetramisole hydrochloride of 99.5% optical purity (containing 0.5% D-tetramisole hydrochloride) and 102.5% of theory of technical D-tetramisole hydrochloride containing 3.4% L-tetramisole hydrochloride.

EXAMPLE 9

This example demonstrates the prepartion of the new substance D(+)-tetramisole N-p-toluenesulphonyl-L(+)-glutamate.

20 g. N-p-toluenesulphonyl-L(+)-glutamic acid, M.P. 122.5° $(\alpha)_D^{20}$+14.3° ($C_{10}$, $CH_3OH$) was added to 135 ml. aqueous solution containing 15.8 g. D(+)-tetramisole hydrochloride. After heating to 90° C., 65 ml. 1.01 N sodium hydroxide solution was added. On cooling, an oil separated which later solidified. The solid was filtered off and recrystallised twice from water to yield 22 g. D(+)-tetramisole N-p-toluenesulphonyl-L(+)-glutamate, M.P. 135° C. to 137° C., $(\alpha)_D^{20}$ +82.8° ($C_{10}$, $CH_3OH$).

EXAMPLE 10

This example demonstrates the preparation of the new substance D(+)-tetramisole N-benzenesulphonyl-L(+) glutamate.

12.0 g. N-benzenesulphonyl-L(+)-glutamic acid, M.P. 137° C., $(\alpha)_D^{20}$+20° ($C_1$, ethyl acetate) was added to 50 ml. aqueous solution containing 10 g. D(+)-tetramisole hydrochloride. After heating to 90° C., 41 ml. 1.01 N sodium hydroxide solution was added. On cooling, an oil separated which did not crystallise over a period of 3 days. The oil was washed six times with water and dried under reduced pressure to yield 15 g. of a glass-like solid material, $(\alpha)_D^{20}$ +78.6° ($C_{10}$, $CH_3OH$). Analysis showed this material to be D(+)-tetramisole N-benzenesulphonyl-L(+)-glutamate.

EXAMPLE 11

This example demonstrates the preparation of the new substance L(—)-tetramisole N-benzenesulphonyl-L(+)-glutamate as the monohydrate.

10 g. L(—)-tetramisole (base) and 14 g. N-benzenesulphonyl-L(+)-glutamic acid in 50 ml. water were heated to 80° C. to give a clear solution. On cooling, crystals separated and were filtered off. The solid was recrystallised twice from water to yield 16 g. L(—)-tetramisole N-benzenesulphonyl-L(+)-glutamate monohydrate, M.P. 84 to 85° C. $(\alpha)_D^{20}$ —26.6° ($C_{10}$, $CH_3OH$).

EXAMPLE 12

Example 2 was repeated except that, instead of the N-p-toluenesulphonyl-L(+)-glutamate, the corresponding D(—)-glutamate was employed to give D-tetramisole N - p - toluenesulphonyl-D(—)-glutamate monohydrate which was converted to D-product in high purity and yield.

EXAMPLE 13

Example 12 was repeated using instead of the sodium salt of N-benzenesulphonyl-D(—)-glutamic acid with essentially equivalent results.

EXAMPLE 14

The following compounds were dissolved in 62.8 ml. water, with warming:

|  | G. |
|---|---|
| N-p-nitrobenzenesulphonyl - L(+) - glutamic acid (0.0522 mole) | 17.33 |
| D,L-tetramisole (base) (0.0522 mole) | 10.65 |
| D,L-tetramisole hydrochloride (0.0522 mole) | 12.55 |

The solution was cooled in ice with stirring for 30 minutes and allowed to stand for 24 hours at room temperature. The crystals of crude D-tetramisole N-p-nitrobenzenesulphonyl - L(+) - glutamate were filtered off, washed twice with 2 ml. portions of iced water, dried and weighed.

The yield of crude product was 21.00 g. (0.0392 mole), 75% of theory. The salt was suspended in 50 ml. water and 50 ml. of methylene chloride and basified to pH 12 with 40% (w./v.) sodium hydroxide solution. The methylene chloride extract was separated, washed with water, dried over anhydrous sodium carbonate and the solvent removed by evaporation. The yield of crude D-tetramisole (base) was 7.99 g. (0.0392 mole), 75% of theory, M.P. 57° C. The specific rotation of the product was +65.3° ($C_{10}$, $CHCl_3$).

EXAMPLE 15

The following compounds were dissolved, with warming, in 62.8 mls. water:

|  | G. |
|---|---|
| N-p-fluorobenzenesulphonyl - L(+) - glutamic acid (0.0522 mole) | 15.92 |
| D,L-tetramisole (base, 0.0522 mole) | 10.65 |
| D,L-tetramisole hydrochloride (0.0522 mole) | 12.55 |

The solution was cooled in ice for 30 minutes, filtered, and the crystals washed twice with 2 ml. portions of iced water, dried and weighed.

The yield of crude L-tetramisole N-p-fluorobenzenesulphonyl-L(+)-glutamate was 17.83 g. (0.035 mole), 67% of theory. The salt was suspended in 50 ml. water and 50 ml. methylene chloride and basified to pH 12 with 40% (w./v.) sodium hydroxide solution. The methylene chloride extract was washed with water, dried over anhydrous sodium carbonate and evaporated to dryness. The yield of crude L-tetramisole (base) was 7.13 g. (0.035 mole), 67% of theory, M.P. 57° C. The specific rotation of the product was —74.5° ($C_{10}$, $CHCl_3$).

EXAMPLE 16

The following solutions were prepared:

(a) A 1 M aqueous solution of D,L-tetramisole hydrochloride was made by dissolving 24.08 g. D,L-tetramisole hydrochloride in 100 mls. of water.

(b) A 1 M monosodium p-bromobenzenesulphonyl-L(+)-glutamate was made up by dissolving 3.66 g. of the acid (10 mE) in 5 ml. 2 N NaOH and diluting to 10 ml.

These solutions were then mixed in the following proportions:

8 ml. solution (a)=4 mE each D- and L-tetramisole (0.816 g. each)

4 ml. solution (b)≡4 mE resolving acid.

The crystals which formed were filtered (at room temperature), washed with water and the free base was liberated with caustic soda and extracted with methylene chloride. In this way, 0.66 g. or 81% theoretical yield of tetramisole isomer (base) was obtained. A 3% solution in chloroform of the base (M.P. 56°) was found to have a specific rotation of +66° which corresponds to a mixture of 88% D-tetramide and 12% L-tetramisole (base).

EXAMPLE 17

This example demonstrates the crystallisation of the diastereoisomeric salt of L-tetramisole by slow addition of monosodium N-p-toluenesulphonyl-L(+)-glutamate solution to a solution of D,L-tetramisole hydrochloride.

A solution of 170 lb. D,L-tetramisole hydrochloride in 80 gal. water was stirred at 40° C. A solution of 114 lb. monosodium N-p-toluenesulphonyl-L(+) - glutamate in 60 gal. water at pH 4.0 was slowly pumped to a vessel containing the tetramisole solution (total addition time 50 minutes). The pH of the solution was monitored continuously and kept at 4.0 by occasional addition of small quantities of concentrated hydrochloric acid. On completion of the addition, the vessel contents were cooled to 20° C. and filtered. Fine, but easily filterable crystals were produced.

Yield and optical purity of the dried L-tetramisole N-p-toluenesulphonyl-L(+)-glutamate were 156.5 lb. (88% yield), specific rotation of tetramisole (base) isolated from the glutamate salt $(\alpha)_D^{20}$ —84.0° ($C_{10}$, $CHCl_3$).

EXAMPLE 18

This example demonstrates precipitation of the diastereoisomeric salt of L-tetramisole at ambient temperature.

A solution of 170 lb. D,L-tetramisole hydrochloride in 80 gal. water was mixed with a solution of 122 lb. disodium N-p-toluenesulphonyl-L(+)-glutamate in 60 gal. water. The pH of the clear solution was 7.5 (20° C.). 3.7 gal. concentrated hydrochloride acid was added slowly (over 50 minutes) with agitation and the pH of the solution dropped to 4.0. Crystallisation commenced when 0.9 gal. acid had been added. The temperature of the mixture rose by 2.7° C. The crystals were fine, easy to filter and wash.

Yield was 89% of theory, and optical purity of the L-tetramisole N - p - toluenesulphonyl - L(+) - glutamate product was 98.9%.

EXAMPLE 19

D,L-tetramisole (base) (62.5 g.) was suspended in water (250 ml.) and converted to the hydrochloride by addition of 11 N hydrochloric acid to pH 3. The solution temperature was raised to 50° C. and carbon (3.1 g.) added. The pH of the solution was adjusted with 18.8 N sodium hydroxide solution so that a sample diluted twentyfold had a pH of 6.5 to 7. After 2 hours stirring at 50° C. the carbon was filtered off and the clear solution added to a solution at 80° C. of N-p-toluenesulphonyl-L(+)-glutamic acid monosodium salt made by diluting 197 ml. of a solution of a mixture of mono- and disodium salts of N-p-toluenesulphonyl-L(+)-glutamic acid (equivalent to 45.0 g. N-p-toluenesulphonyl-L(+)-glutamic acid) with 100 ml. water and adjusting to pH 4.0 with 11 N hydrochloric acid. The temperature of the mixture was raised to 80° C. and the clear solution allowed to cool slowly to 20° C. The crystalline crop was filtered off and washed with water (80 ml.) to yield L(−) - tetramisole N-p-toluenesulphonyl-L(+)-glutamate monohydrate (72.9 g., 91.0%) which was suspended in water (100 ml.), treated with 18.8 N sodium hydroxide solution of pH 10–11 and the mixture extracted with toluene (150 ml.). The aqueous layer contained re-usable disodium N-p-toluenesulphonyl-L(+)-glutamate and was separated off. The toluene layer contained L-tetramisole (base) and was stirred for 5 hours with carbon (3 g.) and anhydrous sodium sulphate (4.5 g.). The mixture was filtered and isopropanol (8 ml.) added to the filtrate followed by dropwise addition of a 20% w./w. solution of hydrogen chloride is isopropanol to pH 1–2. L(−)-tetramisole hydrochloride was filtered off and washed with toluene (40 ml.) and twice with acetone (30 ml.) to give 31.4 g. (85.6%) M.P. 226–229° C. $(\alpha)_D^{23} = -125.4°$ (C=4, $H_2O$).

The filtrate after removal of L(−)-tetramisole N-p-toluenesulphonyl-L(+) - glutamate contained D(+)-tetramisole hydrochloride from which D(+)-tetramisole (base) was isolated by addition of ice (150 g.) followed by slow addition of 18.8 N sodium hydroxide solution to pH 10–11. D(+)-tetramisole (base) was filtered off, washed with water (50 ml.) and after fluidised-bed drying was suitable for racemisation.

EXAMPLE 20

This example demonstrates the effect of a slight molar excess (4.7%) of resolving acid N-p-toluenesulphonyl-L(+)-glutamic acid.

9.83 g. N - p-toluenesulphonyl - L(+) - glutamic acid (0.0326 mole) was added to 15.0 g. D,L-tetramisole hydrochloride (0.0623 mole) dissolved in 123 ml. water. The solution was heated to 90° C. and 32.4 ml. 1.01 N sodium hydroxide solution was added. The crystals which separated on cooling were filtered off, washed with water and dried, yielding 15.20 g. L-tetramisole N-p-toluenesulphonyl-L(+) - glutamate monohydrate (0.0290 mole), 91.3% of theory. The salt was suspended in water, basified with 40% (w./v.) aqueous sodium hydroxide and extracted into methylene chloride. The extract was dried over anhydrous sodium carbonate and evaporated to dryness yielding the theoretical amount of total tetramisole (base), $(\alpha)_D^{20} - 83.8°$ ($C_{10}$, $CHCl_3$) which, compared with the corresponding rotation of pure L-tetramisole, is equivalent to 98.7% purity.

EXAMPLE 21

This example illustrates the effect of the use of a larger excess of resolving acid (9.8% molar excess).

10.31 g. N - p-toluenesulphonyl - L(+)-glutamic acid (0.0342 mole) was added to 15.0 g. D,L-tetramisole hydrochloride (0.0623 mole) dissolved in 125 ml. water. The solution was heated to 90° C. and 33.9 ml. 1.01 N sodium hydroxide solution was added. The solution was cooled and the crystalline precipitate filtered off, washed and dried, yielding 15.37 g. L-tetramisole N-p-toluenesulphonyl - L(+) - glutamate monohydrate (0.0294 mole), 94.3% of theory. The salt was converted to tetramisole (base) in the usual manner; specific rotation $(\alpha)_D^{20} - 83.9°$ ($CH_{10}$, $CHCl_3$), 98.8% pure.

What we claim is:

1. In a process for the resolution of racemic tetramisole (DL-6-phenyl - 2,3,5,6 - tetrahydroimidazo [2,1-b] thiazole) into its optically active D- and L-isomers involving the steps of (1) adding an optically active isomer of an acid, or a soluble salt thereof, to a solution of the racemic tetramisole, or a soluble salt thereof, to form a salt with one of the optical isomers of tetramisole which is substantially less soluble in the reaction medium than the corresponding salt with the other optical isomer of tetramisole and in which the concentration of the reactants in the medium is such that the less soluble salt crystallizes from the medium to the substantial exclusion of the more soluble salt, (2) reacting the separated less soluble salt with a base to liberate the optical isomer of tetramisole and isolating said liberated optical isomer, (3) reacting the mother liquor containing the more soluble salt with a base to liberate the remaining racemate and the other optical isomer of tetramisole and isolating the same and (4) recovering the optically active isomer of the acid for further use, the improvement whereby said acid is selected from the group consisting of N-p-toluenesulphonyl-L(+)-glutamic acid,
N-p-toluenesulphonyl-D-(—)-glutamic acid,
N-benzenesulphonyl-L(+)-glutamic acid,
N-benzenesulphonyl-D-(—)-glutamic acid,
N-p-nitrobenzenesulphonyl-L(+)-glutamic acid,
N-p-nitrobenzenesulphonyl-D(—)-glutamic acid,
N-p-fluorobenzenesulphonyl-D(+)-glutamic acid,
N-p-fluorobenzenesulphonyl-D(—)-glutamic acid,
N-p-bromobenzenesulphonyl-D(+)-glutamic acid and
N-p-bromobenzenesulphonyl-D(—)-glutamic acid, and the medium is water adjusted to a pH of between 3.0 and 5.0.

2. A process according to claim 1 wherein the soluble salt of racemic tetramisole is a salt with a mineral acid and the soluble salt of the optical isomer of an N-arylsulphonylglutamic acid is a mono- or di-alkali metal salt.

3. A process according to claim 1 wherein each mole of tetramisole isomer to be separated from its antipode is treated with between 0.9 and 1.2 moles of the optical isomer of said N-arylsulphonylglutamic acid.

4. A process according to claim 3 wherein the temperature of the reaction mixture is initially between 70° C. and 90° C., and is then reduced to below 30° C.

5. A process according to claim 2 wherein a di-alkali metal salt of N-p-toluenesulphonyl-L(+)-glutamic acid is used, the reaction temperature is between 30° C. and 10° C. and, after mixing the reagents, the pH is controlled to a value between 3.8 and 4.2 by the addition of acid.

6. A process according to claim 1 wherein the remaining racemate and the other optical isomer of tetramisole are isolated from the mother liquor, after being liberated by the addition of base, by extraction into a water-immiscible solvent selected from the group consisting of perchloroethylene, trichloroethylene, toluene and benzene, separating the solvent phase, cooling the solvent phase until a precipitate of the racemate is obtained, removing the precipitated racemate, and cooling the remaining solvent to precipitate the other optical isomer of tetramisole.

7. A process according to claim 1 wherein a solution of a water soluble salt of racemic tetramisole in an aqueous medium is reacted with a mono- or di-alkali metal salt of N-p-toluenesulphonyl-L(+)-glutamic acid K at a pH of from 3.0 to 5.0, whereby the diasteroisomeric salt A of the L-isomer is precipitated and filtered off; the aqueous mother liquor C is extracted with a water-immiscible organic solvent $S_1$ selected from the group consisting of perchloroethylene, trichloroethylene, toluene and benzene, to give an extract D of the D-isomer and residual racemate B; the extract D is cooled to precipitate the residual racemate B which is filtered off; the filtrate is cooled further to precipitate a residue E of crude D-isomer which is also filtered off; the diastereoisomeric salt A is reacted with an alkali metal base F to liberate the L-isomer as the free base and to form the salt G of alkali metal base F with the resolving acid K; the L-isomer as the free base is extracted into an organic solvent $S_2$ selected from the group consisting of perchloroethylene, trichloroethylene, toluene and benzene to form an organic phase N which is separated from the aqueous phase N; the organic solvent $S_2$ in organic phase H is evaporated to give the L-isomer; the aqueous phase M containing salt G, or acid K if a mineral acid is added to the aqueous phase, is then used in a further reaction cycle with fresh racemic tetramisole, and the cycle is repeated from 2 to 5 times.

References Cited

UNITED STATES PATENTS 3,463,786    8/1969    Bullock    260—306.7

ALEX MAZEL, Primary Examiner

R. J. GALLAGHER, Assistant Examiner

U.S. Cl. X.R.

260—518, 999